United States Patent
Yoshitsugu

(10) Patent No.: US 7,319,563 B2
(45) Date of Patent: Jan. 15, 2008

(54) ZOOM LENS SYSTEM, IMAGING DEVICE AND CAMERA

(75) Inventor: Keiki Yoshitsugu, Sakai (JP)

(73) Assignee: Matsushita Electric Industrial Co., Ltd., Osaka (JP)

(*) Notice: Subject to any disclaimer, the term of this patent is extended or adjusted under 35 U.S.C. 154(b) by 97 days.

(21) Appl. No.: 11/157,185

(22) Filed: Jun. 21, 2005

(65) Prior Publication Data

US 2006/0056045 A1    Mar. 16, 2006

(30) Foreign Application Priority Data

Jun. 22, 2004    (JP)    ............... 2004-184110

(51) Int. Cl.
G02B 15/14    (2006.01)
(52) U.S. Cl. ............... 359/689; 359/695; 359/754; 359/784; 396/79; 353/101
(58) Field of Classification Search ............... 359/689, 359/784, 676, 695, 735, 740, 741, 748, 754, 359/796, 797; 396/79; 353/101
See application file for complete search history.

(56) References Cited

U.S. PATENT DOCUMENTS

| | | | |
|---|---|---|---|
| 6,229,655 B1 | 5/2001 | Kohno et al. | |
| 6,456,443 B2 | 9/2002 | Kohno et al. | |
| 6,532,114 B1 | 3/2003 | Kohno et al. | |
| 6,538,824 B1 * | 3/2003 | Mihara et al. | 359/684 |
| 6,545,819 B1 | 4/2003 | Nanba et al. | |
| 6,900,947 B2 * | 5/2005 | Nakatani et al. | 359/689 |
| 7,142,371 B2 * | 11/2006 | Mihara | 359/689 |
| 2001/0022694 A1 | 9/2001 | Tanaka | |
| 2002/0149857 A1 | 10/2002 | Nobe | |
| 2003/0133201 A1 | 7/2003 | Nanba et al. | |

(Continued)

FOREIGN PATENT DOCUMENTS

JP    2000-267009    9/2000

(Continued)

OTHER PUBLICATIONS

Chinese Office Action dated Jun. 1, 2007.

(Continued)

Primary Examiner—Ricky Mack
Assistant Examiner—Joseph Martinez
(74) Attorney, Agent, or Firm—McDermott Will & Emery LLP

(57) ABSTRACT

An object is to provide a high-resolution zoom lens system which has fewer lens elements and therefore, can be retracted into a compact form when not in use; and the zoom lens system, in order from the object side, comprises a first lens unit G1 having negative power, a second lens unit G2 having positive power and a third lens unit G3 having positive power, wherein magnification is varied with change in intervals between each lens unit by independently moving each lens unit along an optical axis, in which the first lens unit G1 comprises one negative lens element L1 and one positive lens element L2, the second lens unit G2 comprises only a cemented lens element having set of three lens elements L3, L4 and L5 which are cemented with each other, and the third lens unit G3 comprises one positive lens element L6.

21 Claims, 9 Drawing Sheets

U.S. PATENT DOCUMENTS

| | | |
|---|---|---|
| 2003/0197951 A1 | 10/2003 | Nanba et al. |
| 2004/0004772 A1 | 1/2004 | Ohashi et al. |
| 2005/0024749 A1 | 2/2005 | Nanba et al. |
| 2005/0030642 A1 | 2/2005 | Nanba et al. |
| 2005/0041303 A1 | 2/2005 | Nanba et al. |

FOREIGN PATENT DOCUMENTS

| | | |
|---|---|---|
| JP | 2001-242378 | 9/2001 |
| JP | 2001-272602 | 10/2001 |
| JP | 2002-196240 | 7/2002 |
| JP | 2003-287679 | 10/2003 |

OTHER PUBLICATIONS

English Translation of Chinese Office Action Issued in Corresponding Chinese Patent Application No. 2005100814496, Dated on Jun. 1, 2007.

* cited by examiner

FIG. 2A  F 2.88
FIG. 2B  W 31.53
FIG. 2C  W 31.53
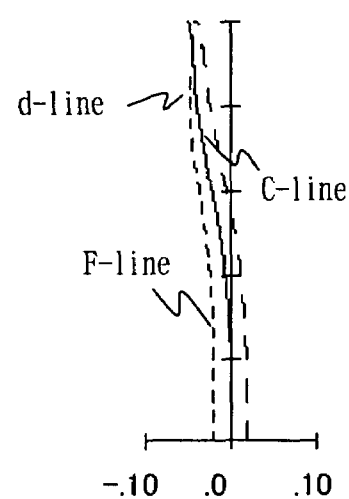
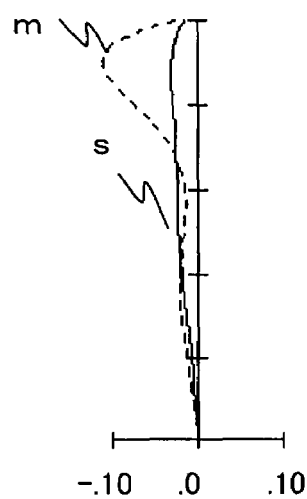
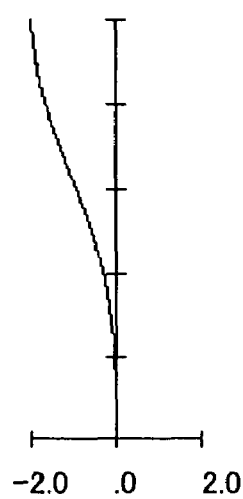
FIG. 2D  F 3.58
FIG. 2E  W 19.78
FIG. 2F  W 19.78
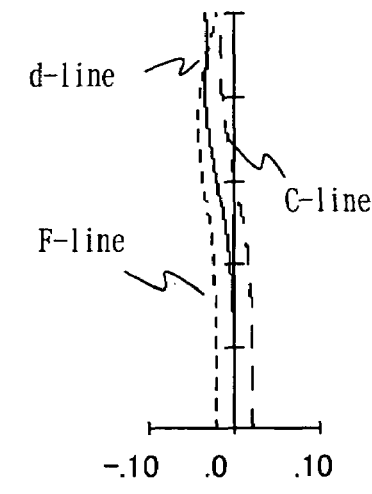
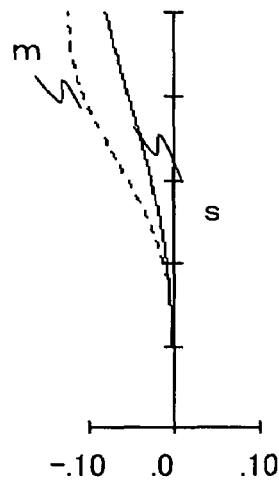
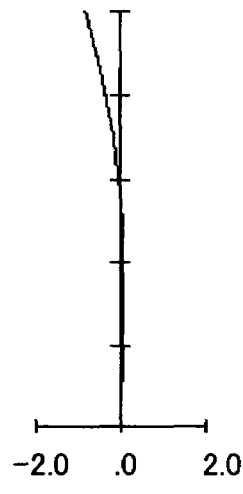
FIG. 2G  F 5.14
FIG. 2H  W 11.60
FIG. 2I  W 11.60
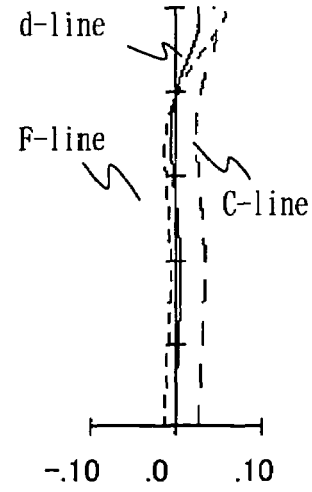
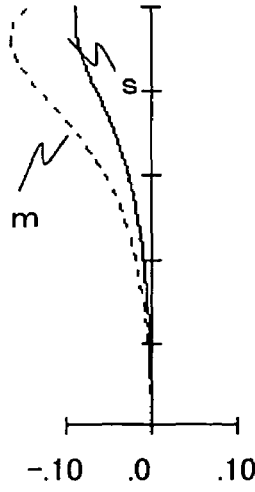
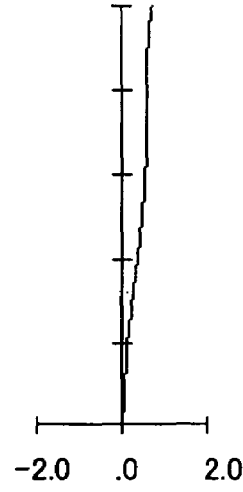
SPHERICAL ABERRATION (mm)   ASTIGMATISM (mm)   DISTORTION (%)

FIG. 4A  F 2.87
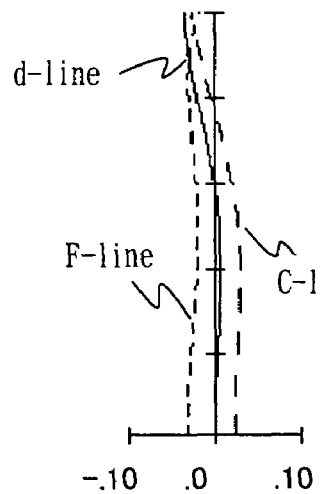
FIG. 4B  W 31.54
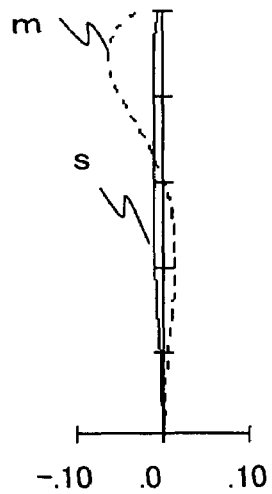
FIG. 4C  W 31.54
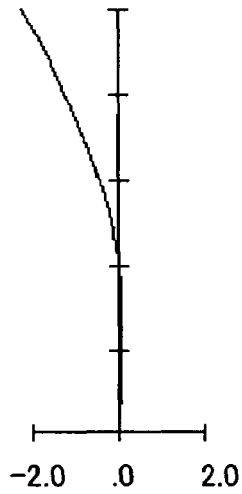
FIG. 4D  F 3.56
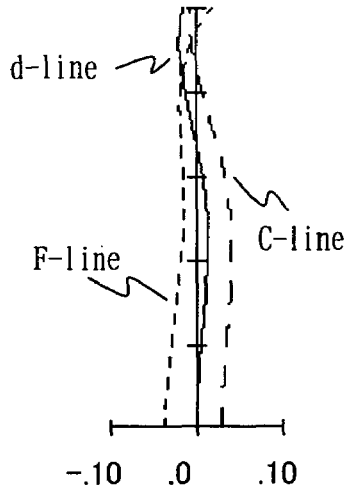
FIG. 4E  W 20.27
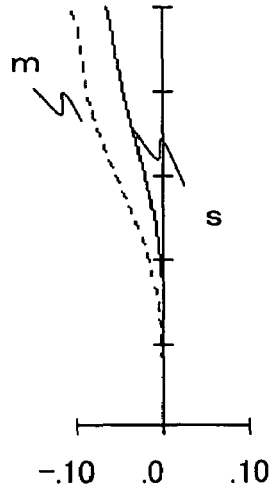
FIG. 4F  W 20.27
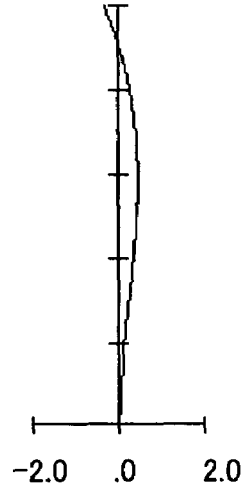
FIG. 4G  F 5.14
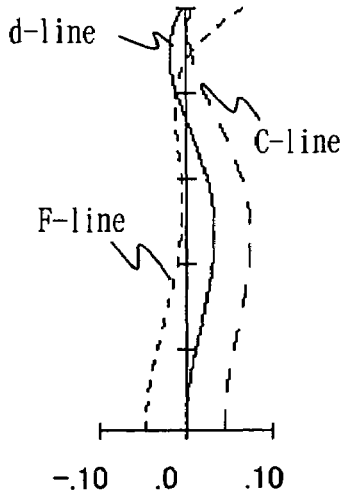
FIG. 4H  W 11.60
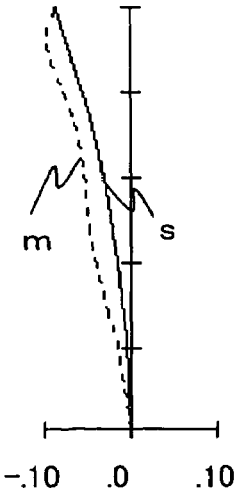
FIG. 4I  W 11.60
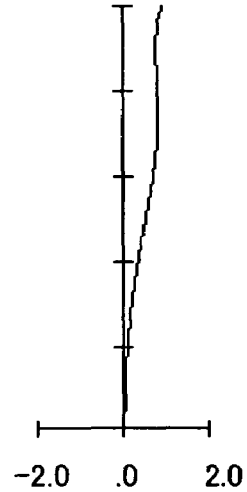
SPHERICAL ABERRATION (mm)    ASTIGMATISM (mm)    DISTORTION (%)

FIG. 6A  F 2.89
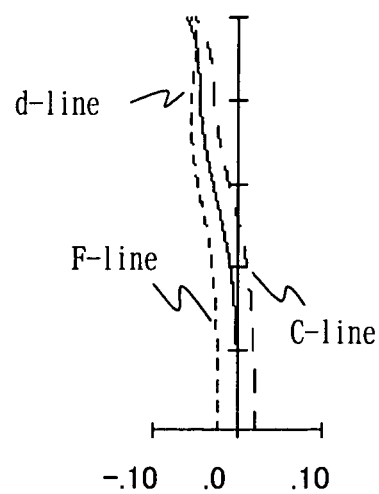
FIG. 6B  W 31.58
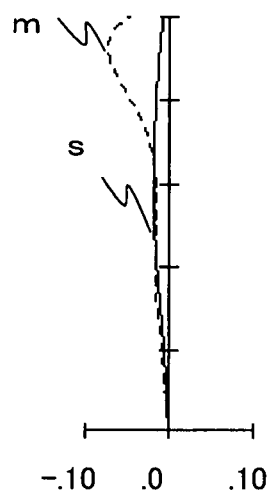
FIG. 6C  W 31.58
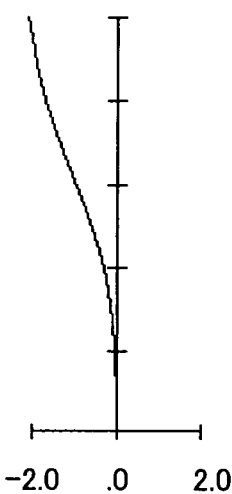
FIG. 6D  F 3.57
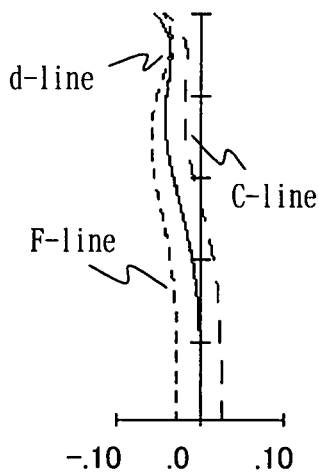
FIG. 6E  W 19.70
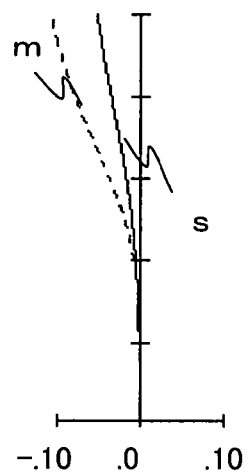
FIG. 6F  W 19.70
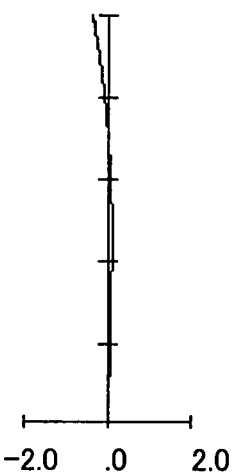
FIG. 6G  F 5.11
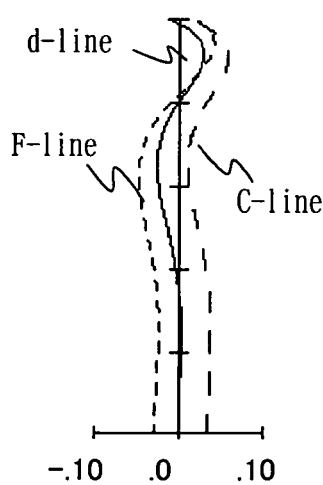
FIG. 6H  W 11.55
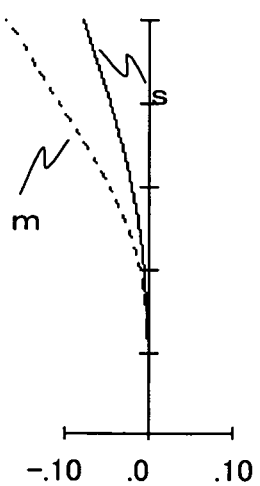
FIG. 6I  W 11.55
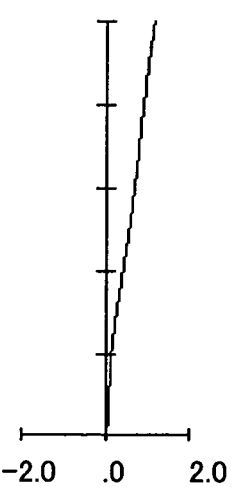
SPHERICAL ABERRATION (mm)   ASTIGMATISM (mm)   DISTORTION (%)

FIG. 8A F 2.89   FIG. 8B W 31.80   FIG. 8C W 31.80
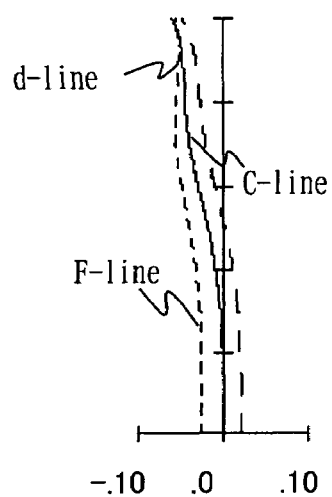
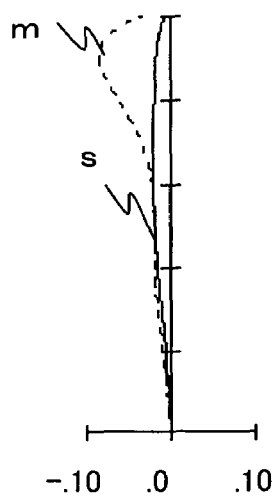
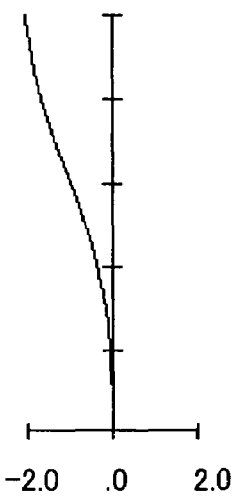
FIG. 8D F 3.58   FIG. 8E W 19.73   FIG. 8F W 19.73
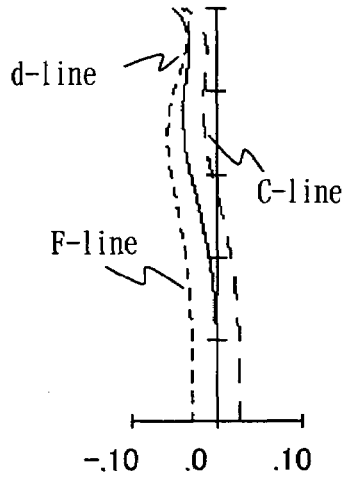
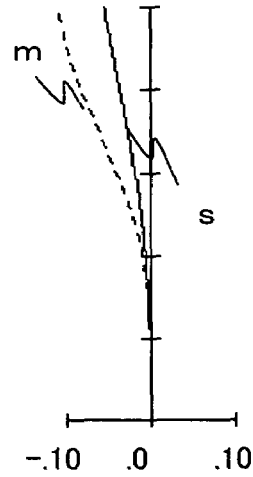
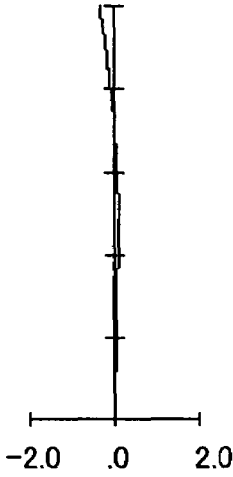
FIG. 8G F 5.13   FIG. 8H W 11.55   FIG. 8I W 11.55
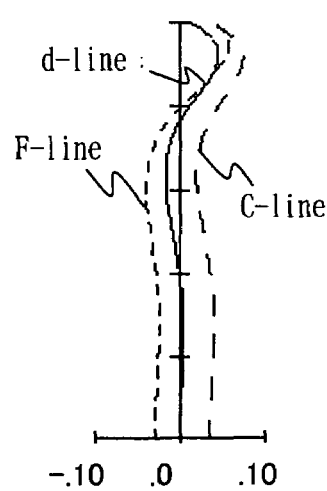
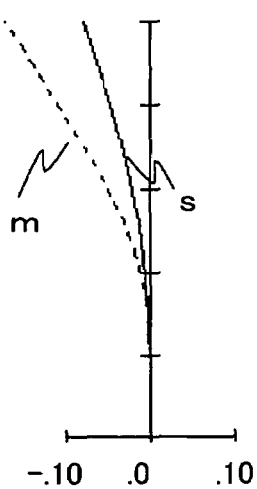
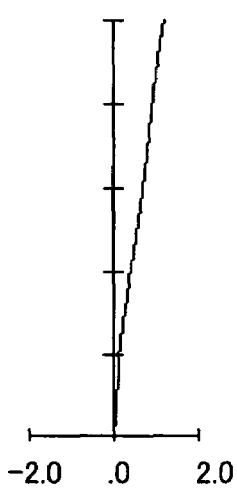
SPHERICAL ABERRATION (mm)   ASTIGMATISM (mm)   DISTORTION (%)

ZOOM LENS SYSTEM, IMAGING DEVICE AND CAMERA

BACKGROUND OF THE INVENTION

1. Field of the Invention

The present invention relates to a zoom lens system, an imaging device and a camera, and more particularly, to a small-size and high-image-quality zoom lens system having a viewing angle of 60° to 70° at the wide-angle limit and a zoom ratio of about 3×, which is suitable for digital still cameras, digital video cameras and the like, an imaging device having the zoom lens system, and a camera having the imaging device.

2. Description of the Background Art

In digital still cameras using a solid-state image sensor such as a CCD (charge coupled device) or a CMOS (complementary metal-oxide semiconductor), since a member such as an optical low-pass filter is disposed between the rearmost part of the lens elements and the solid-state image sensor, a lens system having a comparatively long back focal length is required. Moreover, the image-taking optical system of digital still cameras is required of an excellent telecentric characteristic in order to avoid shading which is a factor that decreases the quantity of peripheral light on the image surface.

Many forms of digital still cameras can be considered, and one form is a compact type. As zoom lens systems suitable for compact-type digital still cameras, there have been proposed many three-unit zoom lens systems, in order from the object side, including a first lens unit having negative power, a second lens unit having positive power and a third lens unit having positive power (Japanese Laid-Open Patent Publications Nos. 2002-196240, 2001-242378, 2001-272602 and 2003-287679).

However, in the zoom lens system described in Japanese Laid-Open Patent Publication No. 2002-196240, the second lens unit has many lens elements and therefore, it is difficult to retract the zoom lens system into a compact form when not in use. The zoom lens system described in Japanese Laid-Open Patent Publication No. 2001-242378 has fewer lens elements, but the second lens unit has a large thickness and therefore, it is difficult to retract the zoom lens system into a compact form when not in use. The zoom lens system described in Japanese Laid-Open Patent Publication No. 2001-272602 has fewer lens elements and therefore, can be retracted into a compact form. However, the zoom ratio thereof is as small as about 2×. In Japanese Laid-Open Patent Publication No.2003-287679, there is disclosed a zoom lens system in which the second lens unit includes a cemented lens element having three lens elements which are cemented with each other. However, the second lens unit has a large overall thickness.

SUMMARY OF THE INVENTION

An object of the present invention is to provide a high-resolution zoom lens system which has fewer lens elements and therefore, can be retracted into a compact form when not in use, and an imaging device using the zoom lens system. Moreover, an object of the present invention is to provide a camera having the imaging device.

The above objects are achieved by the following zoom lens system for forming an optical image of an object with variable magnification, in order from the object side, comprising:

a first lens unit having negative power,
a second lens unit having positive power and
a third lens unit having positive power, wherein
  magnification is varied with change in intervals between each lens unit by independently moving each lens unit along an optical axis, and characterized in that
  the first lens unit comprises one negative lens element and one positive lens element;
  the second lens unit comprises only a cemented lens element having set of three lens elements which are cemented with each other; and
  the third lens unit comprises one positive lens element.

Preferably, the zoom lens system comprises a diaphragm on an object side of the second lens unit. Preferably, the first lens unit, in order from the object side, comprises one negative lens element and one positive lens element. Preferably, the second lens unit comprises a cemented lens element, in order from the object side, having a positive lens element, a negative lens element and a positive lens element, which are cemented with each other.

Preferably, the conditions are satisfied:

$$nd4<1.75 \tag{1}$$

$$vd4<35 \tag{2}$$

where nd4 is a refractive index to a d-line of the negative lens element of the second lens unit, and vd4 is Abbe number thereof.

Preferably, the condition is satisfied:

$$0.2<|fL4|/fG2<0.4 \tag{3}$$

where fG2 is a focal length of the second lens unit, and fL4 is a focal length of the negative lens element.

Preferably, the condition is satisfied:

$$3<dGsi/Z<5 \tag{4}$$

(here, Z>2.5)

where Z is a zoom ratio at wide-angle and telephoto limits when a shooting distance is ∞, dGi is a thickness of an i-th lens unit (i is an integer), and dGsi [unit: mm] is a sum of thickness of each lens unit.

Preferably, focusing from an infinity object point to a close object point is performed by moving the third lens unit in the direction of an optical axis. Preferably, one positive lens element of the third lens unit is a biconvex lens.

The above objects are achieved by the following imaging device capable of converting an optical image of a subject to an electric image signal and outputting the electric image signal, comprising:

a zoom lens system for forming the optical image of the subject with variable magnification, and
an image sensor for converting the optical image of the subject formed by the zoom lens system to the electric signal, wherein
  the zoom lens system, in order from an object side, comprises a first lens unit having negative power, a second lens unit having positive power and a third lens unit having positive power, in which magnification is varied with change in intervals between each lens unit by independently moving each lens unit along an optical axis, and characterized in that
  the first lens unit comprises one negative lens element and one positive lens element;
  the second lens unit comprises only a cemented lens element having set of three lens elements which are cemented with each other; and
  the third lens unit comprises one positive lens element.

Preferably, the zoom lens system comprises a diaphragm on an object side of the second lens unit. Preferably, the first lens unit, in order from the object side, comprises one negative lens element and one positive lens element. Preferably, the second lens unit comprises a cemented lens element, in order from the object side, having a positive lens element, a negative lens element and a positive lens element, which are cemented with each other.

Preferably, the conditions are satisfied:

$$nd4<1.75 \qquad (1)$$

$$vd4<35 \qquad (2)$$

where nd4 is a refractive index to a d-line of the negative lens element of the second lens unit, and vd4 is Abbe number thereof.

Preferably, the condition is satisfied:

$$0.2<|fL4|/fG2<0.4 \qquad (3)$$

where fG2 is a focal length of the second lens unit, and fL4 is a focal length of the negative lens element.

Preferably, the condition is satisfied:

$$3<dGsi/Z<5 \qquad (4)$$

(here, Z>2.5)

where Z is a zoom ratio at wide-angle and telephoto limits when a shooting distance is ∞, dGi is a thickness of an i-th lens unit (i is an integer), and dGsi [unit: mm] is a sum of thickness of each lens unit.

Preferably, focusing from an infinity object point to a close object point is performed by moving the third lens unit in the direction of an optical axis. Preferably, one positive lens element of the third lens unit is a biconvex lens.

The above objects are achieved by the following camera capable of image-taking a subject and outputting an image as an electric image signal, comprising:
  an imaging device comprising a zoom lens system for forming an optical image of the subject with variable magnification and an image sensor for converting the optical image of the subject formed by the zoom lens system to the electric signal, wherein
  the zoom lens system, in order from an object side, comprises a first lens unit having negative power, a second lens unit having positive power and a third lens unit having positive power, in which magnification is varied with change in intervals between each lens unit by independently moving each lens unit along an optical axis, and characterized in that
  the first lens unit comprises one negative lens element and one positive lens element;
  the second lens unit comprises only a cemented lens element having set of three lens elements which are cemented with each other; and
  the third lens unit comprises one positive lens element.

Preferably, the camera is a digital still camera capable of obtaining a still image of the subject. Preferably, the camera is a digital video camera capable of obtaining a moving image of the subject.

According to the present invention, it is possible to provide a high-resolution zoom lens system which has fewer lens elements and therefore, can be retracted into a compact form when not in use, and an imaging device using the zoom lens system. According to the present invention, it is also possible to provide a camera having the imaging device.

The zoom lens system of the present invention is applicable to digital input apparatuses such as digital still cameras, digital video cameras, mobile telephones, PDAs (personal digital assistances), surveillance cameras in surveillance systems, web cameras and vehicle-mounted cameras, and particularly, suitable for use as an image-taking optical system such as a digital still camera or a digital video camera, which requires high image quality.

These and other objects, features, aspects and effects will become more apparent from the following detailed description when taken in conjunction with the accompanied drawings.

BRIEF DESCRIPTION OF THE DRAWINGS

FIGS. 2A to 2I are aberration graphics of the zoom lens system according to Example 1;
FIGS. 4A to 4I are aberration graphics of the zoom lens system according to Example 2;
FIGS. 6A to 6I are aberration graphics of the zoom lens system according to Example 3;
FIGS. 8A to 8I are aberration graphics of the zoom lens system according to Example 4.

DESCRIPTION OF THE PREFERRED EMBODIMENTS

Embodiments 1 to 4

Figure 1A:
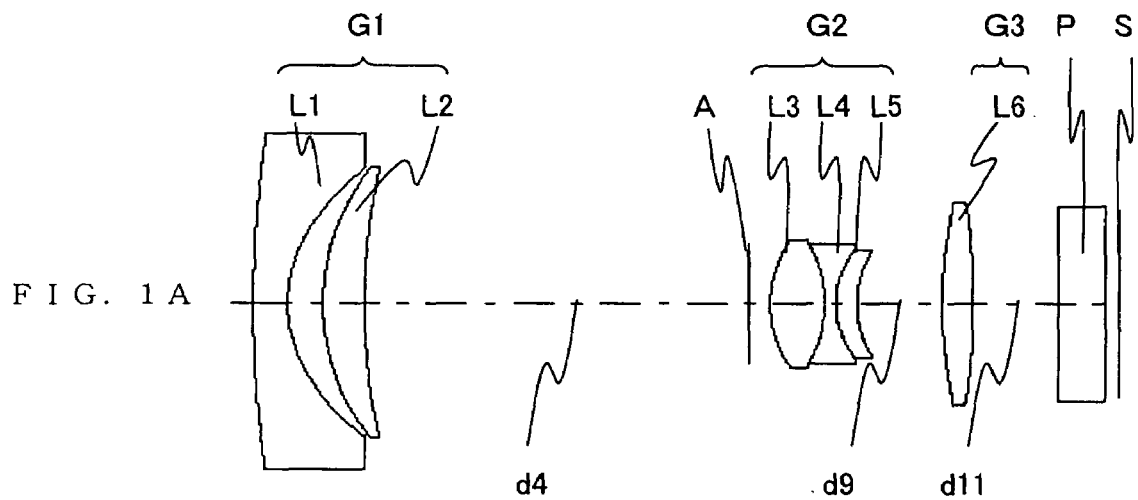
FIGS. 1A to 1C are construction views of a zoom lens system according to Embodiment 1 (Example 1)
Figure 1B:
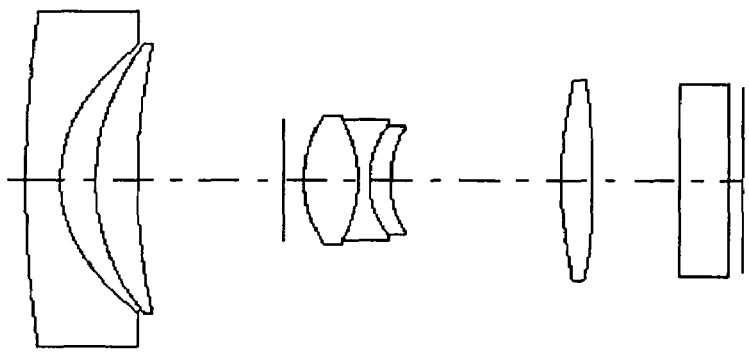
Figure 1C:
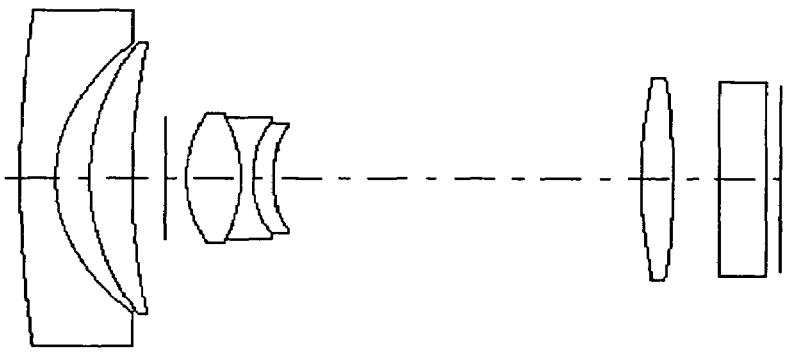
Figure 3A:
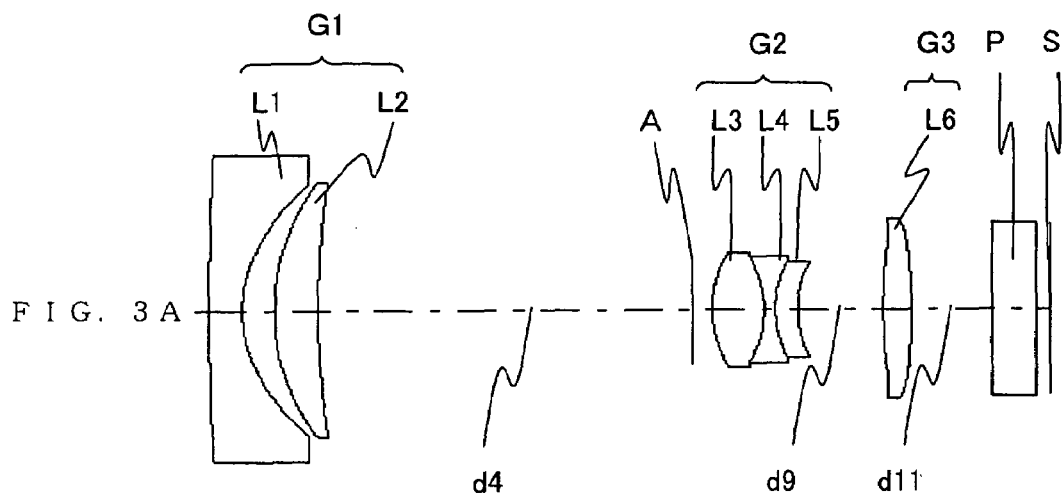
FIGS. 3A to 3C are construction views of a zoom lens system according to Embodiment 2 (Example 2)
Figure 3B:
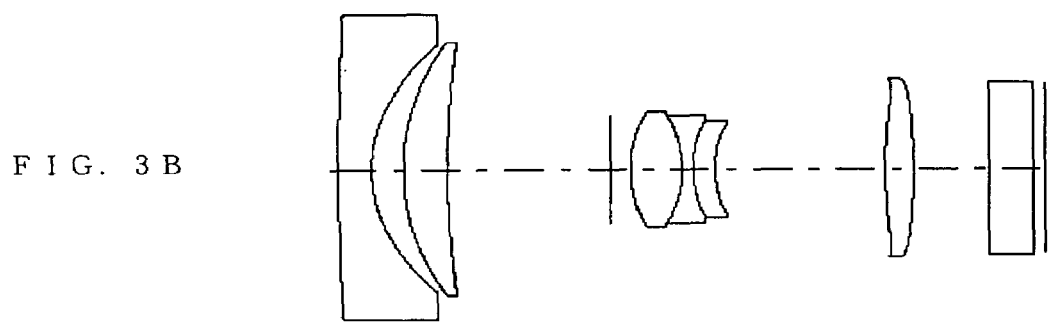
Figure 3C:
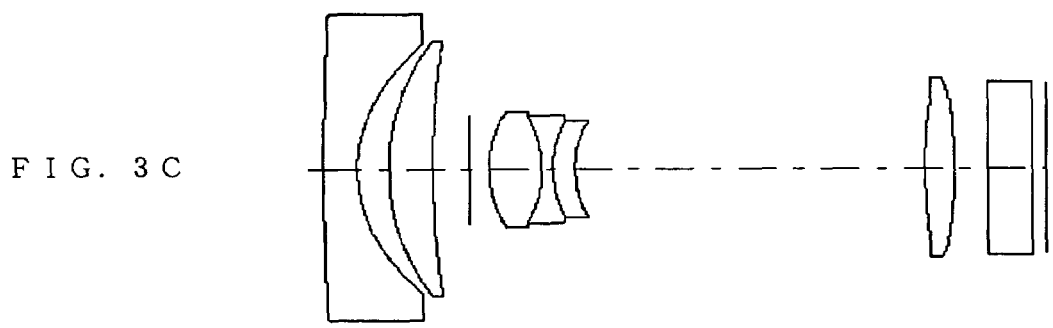
Figure 5A:
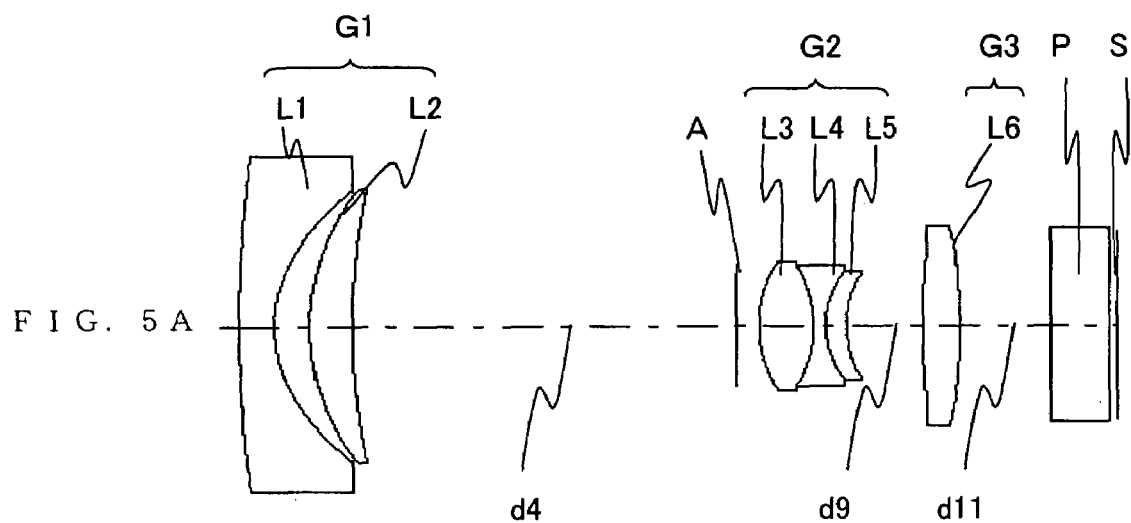
FIGS. 5A to 5C are construction views of a zoom lens system according to Embodiment 3 (Example 3)
Figure 5B:
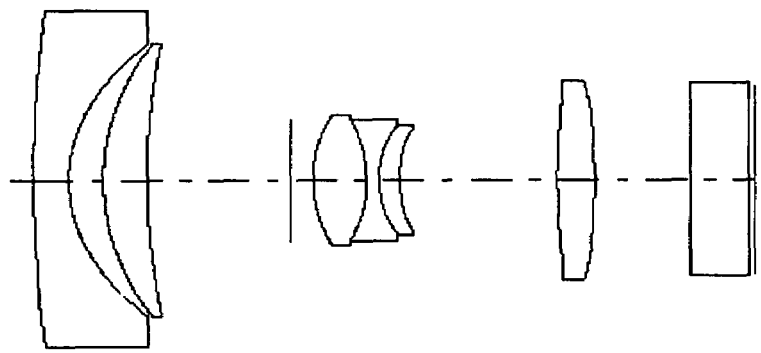
Figure 5C:
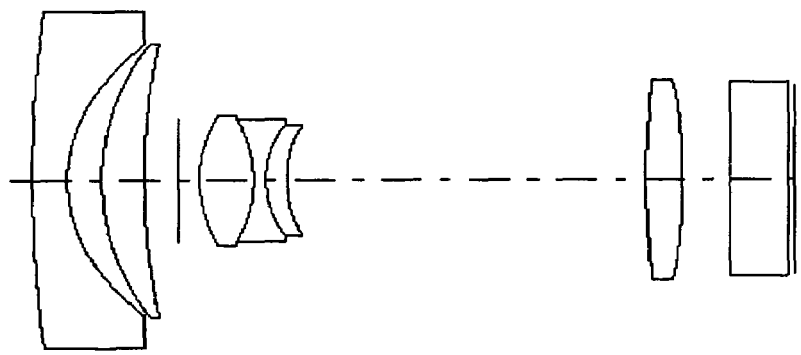
Figures 7A, 7B, 7C:
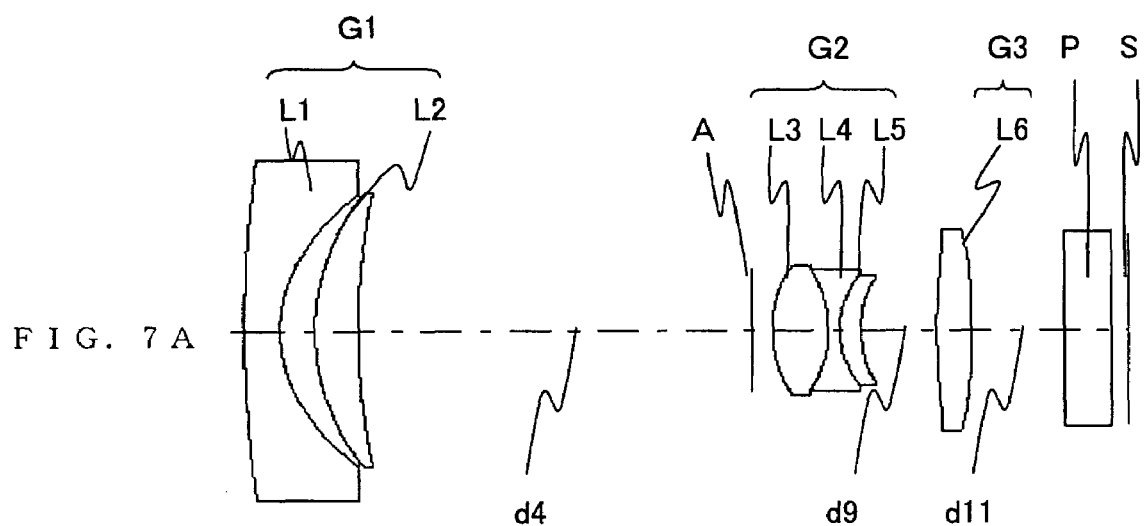
FIGS. 7A to 7C are construction views of a zoom lens system according to Embodiment 4 (Example 4)

FIGS. 1A to 1C are construction views of a zoom lens system according to Embodiment 1. FIGS. 3A to 3C are construction views of a zoom lens system according to Embodiment 2. FIGS. 5A to 5C are construction views of a zoom lens system according to Embodiment 3. FIGS. 7A to 7C are construction views of a zoom lens system according to Embodiment 4. These views each show a zoom lens system in the infinity in-focus condition. FIGS. 1A, 3A, 5A and 7A each show the lens configuration at the wide-angle limit (the shortest focal length condition: the focal length fW). FIGS. 1B, 3B, 5B and 7B each show the lens configuration at the middle position (the middle focal length condition: the focal length fM=√(fW*fT)). FIGS. 1C, 3C, 5C and 7C each show the lens configuration at the telephoto limit (the longest focal length condition: the focal length fT).

The zoom lens systems according to according to Embodiments 1 to 4 each, in order from the object side, comprises a first lens unit G1 having negative power, a diaphragm A, a second lens unit G2 having positive power and a third lens unit G3 having positive power. In the zoom lens systems according to Embodiments 1 to 4, the first lens unit moves toward the image side in a convex trace, the second lens unit and the diaphragm monotonously move toward the object side, and the third lens unit moves toward the image side in a convex or concave trace at the object side, while magnification is varied from the wide-angle limit to the telephoto limit.

In the zoom lens systems according to Embodiments 1 to 4, the first lens unit G1 comprises two lens elements of, in order from the object side, a negative meniscus lens element L1 whose convex surface faces the object side and a positive meniscus lens element L2 whose convex surface faces the object side. In the zoom lens systems according to Embodiments 1 to 4, the second lens unit G2 comprises only a cemented lens element having set of three lens elements of, in order from the object side, a biconvex lens element L3, a biconcave lens element L4 and a positive meniscus lens element L5 whose convex surface faces the object side, which are cemented with each other. In the zoom lens systems according to Embodiments 1 to 4, the third lens unit G3 comprises one biconvex positive lens element L6. In each view, the straight line shown on the right most side indicates the position of the image surface S, and a plane parallel plate P equivalent to an optical low-pass filter, a phase plate of the image sensor or the like is disposed on the object side of the image surface S.

In the zoom lens systems according to Embodiments 1 to 4, each lens unit is disposed in a desired power arrangement, whereby the overall size of the lens system can be reduced while optical performance is maintained.

Particularly, in the zoom lens systems according to Embodiments 1 to 4, the first lens unit G1, in order from the object side, comprises one negative lens element and one positive lens element, the second lens unit G2 comprises only a cemented lens element having set of three lens elements which are cemented with each other, and the third lens unit G3 comprises one positive lens element. The zoom lens systems according to Embodiments 1 to 4 having such a construction are optical systems which have fewer lens elements in each lens unit and therefore, can be retracted into a compact form when not in use.

Moreover, in the zoom lens systems according to Embodiments 1 to 4, the second lens unit G2 comprises only a cemented lens element, in order from the object side, having a positive lens element, a negative lens element and a positive lens element, which are cemented with each other. In the zoom lens systems according to Embodiments 1 to 4 having such a construction, the second lens unit G2 can be constructed in a compact form. Moreover, in the zoom lens systems according to Embodiments 1 to 4 having such a construction, it is easy to center the lens elements with each other and therefore, the assembly process is facilitated, as compared with a case where three lens elements are disposed independently and separately from one another.

Moreover, in the zoom lens systems according to Embodiments 1 to 4, the third lens unit G3 comprises one biconvex positive lens element. With the zoom lens systems according to these embodiments having such a construction, the size when collapsed can be reduced. Furthermore, in the zoom lens systems according to these embodiments, it is possible to perform focusing from the infinity in-focus condition to the close object in-focus condition by moving the third lens unit G3 along the optical axis.

Conditions to be satisfied by the zoom lens systems according to the embodiments will be described. While a plurality of conditions to be satisfied are defined for the zoom lens systems according to these embodiments, a zoom lens system construction which satisfies all the conditions is most preferable. However, by satisfying an individual condition, a zoom lens system showing the corresponding effect can be obtained.

It is preferable that the zoom lens systems according to the embodiments satisfy the conditions:

$$nd4<1.75 \tag{1}$$

$$vd\ vd4<35 \tag{2}$$

where nd4 is the refractive index to the d-line of the negative lens element of the second lens group, and vd4 is the Abbe number thereof.

When the value of the Condition (1) exceeds the upper limit, the Petzval sum becomes large, and it is difficult to correct field curvature. When the value of the Condition (2) exceeds the upper limit, it is difficult to correct chromatic aberration.

It is preferable that the zoom lens systems according to the embodiments satisfy the condition:

$$0.2<|fL4|/fG2<0.4 \tag{3}$$

where fG2 is the focal length of the second lens unit, and fL4 is the focal length of the negative lens element of the second lens unit.

The Condition (3) is a condition for reducing the total optical length of the entire lens system while correcting various aberrations in the second lens unit in a well-balanced manner. When the value of the Condition (3) exceeds the upper limit, it is difficult to correct spherical aberration and coma aberration in the negative lens element of the second lens unit, by other lens elements. On the other hand, when the value of the Condition (3) exceeds the lower limit, the total optical length of the entire lens system increases, and it is difficult to reduce the size of the lens system.

When the following ranges are additionally defined for the Condition (3), the above effect can be further enhanced.

$$0.22<|fL4|/fG2 \tag{3}'$$

$$|fL4|/fG2<0.3 \tag{3}'$$

It is preferable that the zoom lens systems according to the embodiments satisfy the condition:

$$3<dGsi/Z<5 \tag{4}$$

(here, Z>2.5)

where Z is the zoom ratio at the wide-angle and telephoto limits when the shooting distance is ∞, dGi is the thickness of the i-th lens unit (i is an integer), and dGsi is the sum of the thickness of each lens unit.

The Condition (4) relates to the thickness of the lens units. When the value exceeds the upper limit, it is difficult to reduce the size of the entire lens system, particularly to reduce the total optical length when collapsed, while maintaining the zoom ratio. On the other hand, when the value exceeds the lower limit, it is difficult to correct aberrations over the entire zoom range while maintaining the zoom ratio.

When the following ranges are additionally defined for the Condition (4), the above effect can be further enhanced.

$$3.3<dGsi/Z \tag{4}'$$

$$dGsi/Z<4.6 \tag{4}''$$

It is preferable that the zoom lens systems according to the embodiments satisfy the condition:

$$0.7<|r4F/fw|<1.0 \qquad (5)$$

(here, Z>2.5 and r4F<0)

where the second lens unit G2 comprises only a cemented lens element, in order from the object side, having a positive lens element, a negative lens element and a positive lens element, which are cemented with each other, and where r4F is a radius of curvature of the object side surface of the negative lens element, and fw is a focal length of the zoom lens system at the wide-angle limit.

When the middle lens element in the cemented lens element having three elements is a negative lens element, the Condition (5) defines a condition that should be satisfied on the object side surface of the negative lens element. It is not preferable that the value exceeds the upper limit. When the value exceeds the upper limit, positive power on the cementing surface between the object side positive lens element and the negative lens element will be too small, and therefore, it is difficult to correct coma aberration in the second lens unit by other lenses in a well-balanced manner. On the other hand, it is not preferable that the value exceeds the lower limit. When the value exceeds the lower limit, the positive power on the cementing surface between the object side positive lens element and the negative lens element will be too large, and therefore, it is difficult to correct spherical aberration in the second lens unit by other lenses in a well-balanced manner.

When the following ranges are additionally defined for the Condition (5), the above effect can be further enhanced.

$$0.75<|r4F/fw| \qquad (5)'$$

$$|r4F/fw|<0.95 \qquad (5)''$$

It is preferable that the zoom lens systems according to the embodiments satisfy the condition:

$$0.60<|r4R/fw|<85 \qquad (6)$$

(here, Z>2.5)

where the second lens unit G2 comprises only a cemented lens element, in order from the object side, having a positive lens element, a negative lens element and a positive lens element, which are cemented with each other, and where r4R is a radius of curvature of the image side surface of the negative lens element, and fw is a focal length of the zoom lens system at the wide-angle limit.

When the middle lens element in the cemented lens element having three elements is a negative lens element, the Condition (6) defines a condition that should be satisfied on the image side surface of the negative lens element. It is not preferable that the value exceeds the upper limit. When the value exceeds the upper limit, negative power on the cementing surface between the negative lens element and the image side positive lens element will be too small, and therefore, it is difficult to correct spherical aberration and astigmatism in the second lens unit by other lenses in a well-balanced manner. On the other hand, it is not preferable that the value exceeds the lower limit. When the value exceeds the lower limit, the negative power on the cementing surface between the negative lens element and the image side positive lens element will be too large, and therefore, it is difficult to correct coma aberration and astigmatism in the second lens unit by other lenses in a well-balanced manner.

When the following ranges are additionally defined for the Condition (6), the above effect can be further enhanced.

$$0.65<|r4R/fw| \qquad (6)'$$

$$|r4R/fw|<0.80 \qquad (6)''$$

While the lens units in the embodiments comprise only refractive type lenses that deflect the incident light ray by refraction (that is, lenses of a type in which the incident light ray is deflected at the interface between media having different refractive indexes), the present invention is not limited thereto. For example, the lens units may comprise diffractive type lenses that deflect the incident light ray by diffraction, refractive-diffractive hybrid lenses that deflect the incident light ray by a combination of diffraction and refraction, or gradient index lenses that deflect the incident light ray by refractive index distribution in the medium.

Moreover, in the embodiments, the optical path may be bent in front of, behind or in the middle of the zoom lens system by disposing a reflecting surface on the optical path. The position of the bend may be determined as required, and by appropriate bending of the optical path, reduction in the apparent thickness of a camera can be achieved.

Furthermore, in the embodiments, a plate including an optical low-pass filter disposed between the last surface of the zoom lens system and the image sensor is shown. As the low-pass filter, for example, there can be applicable a birefringent low-pass filter made of, for example, a crystal in which a predetermined crystal orientation is adjusted, or a phase low-pass filter that achieves required optical cut-off frequency characteristic by diffraction effect.

As described above, the zoom lens system, in order from the object side, comprises the first lens unit having negative power, the second lens unit having positive power and the third lens unit having positive power; and the first lens unit comprises one negative lens element and one positive lens element, the second lens unit comprises a cemented lens element having set of positive lens element, negative lens element and positive lens element, and the third lens unit comprises one positive lens element; and magnification is varied from the wide-angle limit to the telephoto limit with change in intervals between each lens unit. Thus, it is possible to obtain a zoom lens system having the viewing angle of about 65° at the wide-angle limit and the zoom ratio of about 3×, which has fewer lens elements and therefore, can be retracted into a small form when not in use.

Embodiment 5

Figure 9:
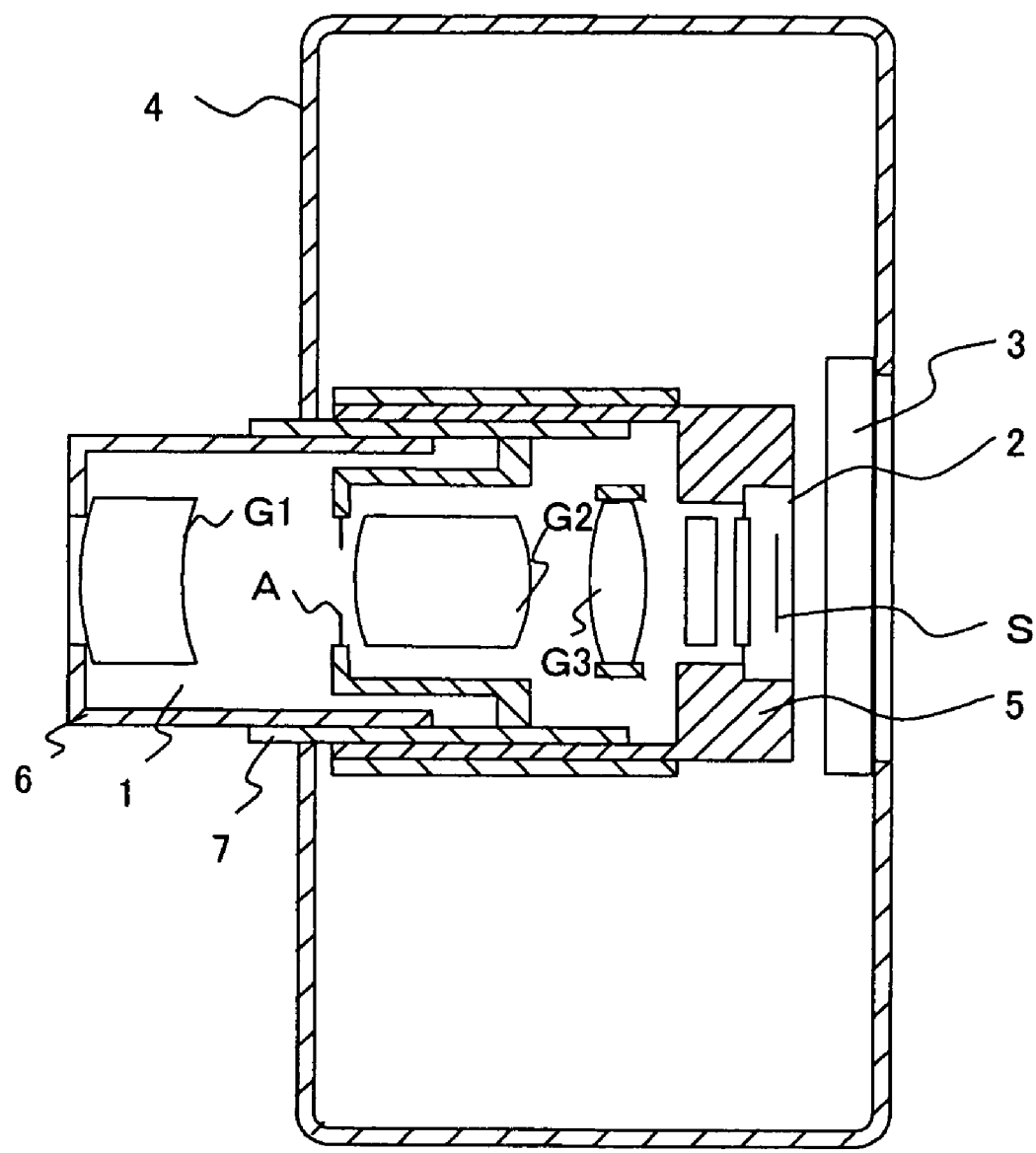
FIG. 9 is a schematic construction view of a digital still camera according to Embodiment 5.

FIG. 9 is a schematic construction view of a digital still camera according to Embodiment 5. Referring to FIG. 9, the digital still camera comprises an imaging device comprising a zoom lens system 1 and a solid-state image sensor 2 which is a CCD; a liquid crystal monitor 3; a body 4; and the like. As the zoom lens system 1, the zoom lens system according to Embodiment 1 is used. Referring to FIG. 9, the zoom lens system 1 comprises the first lens unit G1, the second lens unit G2, the diaphragm A and the third lens unit G3. In the body 4, the zoom lens system 1 is disposed on the front side, and the solid-state image sensor 2 which is a CCD is disposed behind the zoom lens system 1. In the rear of the body 4, the liquid crystal monotor 3 is disposed. An optical image of the subject by the zoom lens system 1 is formed on the imaging surface S.

A lens barrel comprises a main barrel 5, a movable barrel 6 and a cylindrical cam 7. When the cylindrical cam 7 is rotated, the first lens unit G1, the second lens unit G2 and the third lens unit G3 are moved to a predetermined position relative to the solid-state image sensor 2, whereby the magnification can be varied from the wide-angle limit to the telephoto limit. The third lens unit G3 can be moved in the direction of the optical axis by a motor for focus adjustment.

Thus, by using the zoom lens system according to Embodiment 1 in a digital still camera, it is possible to provide a digital still camera having the zoom ratio of about 3×, the viewing angle of about 65° at the wide-angle limit, high resolution and a small depth when not in use. For the digital still camera shown in FIG. 9, any of the zoom lens systems according to Embodiments 2 to 4 may be used instead of the zoom lens system according to Embodiment 1. The optical system of the digital still camera shown in FIG. 9 may be used for digital video cameras intended for moving images. In this case, not only still images but also moving images with high resolution can be taken.

EXAMPLES

Numerical examples which are concrete implementations of the zoom lens systems according to Embodiments 1 to 4 will be described. In the numerical examples, the units of the length in the tables are all given in mm. Moreover, in the numerical examples, r is the radius of curvature, d is the axial distance, nd is the refractive index to the d-line, and νd is the Abbe number.

In the numerical examples, the surfaces marked with * are aspherical surfaces, and the aspherical surface configuration is defined by the following expression:

$$Z = \frac{h^2/r}{1+\sqrt{1-(1+\kappa)(h/r)^2}} + Dh^4 + Eh^6 + Fh^8 + Gh^{10} + Hh^{12} + Ih^{14} + Jh^{16} \ldots (AS)$$

Herein, κ is the conic coefficient, D, E, F, G, H, I and J are fourth-order, sixth-order, eighth-order, tenth-order, twelfth-order, fourteenth-order and sixteenth-order aspherical coefficients, respectively.

Example 1

A zoom lens system of Example 1 corresponds to Embodiment 1 shown in FIGS. 1A to 1C. The lens data of the zoom lens system of Example 1 is shown in Table 1, the aspherical data is shown in Table 2, and the focal length, the F-number, the viewing angle, the total optical length and the variable axial distance data when the shooting distance is ∞ are shown in Table 3.

TABLE 1

| Lens unit | Lens | Surface | r | d | nd | νd |
|---|---|---|---|---|---|---|
| G1 | L1 | 1 | 49.160 | 1.500 | 1.80431 | 40.9 |
|  |  | 2 | 5.848* | 1.500 |  |  |
|  | L2 | 3 | 9.403 | 1.800 | 1.84666 | 23.8 |
|  |  | 4 | 26.468 | Variable |  |  |
| Diaphragm |  | 5 | ∞ | 0.900 |  |  |
| G2 | L3 | 6 | 4.968* | 2.350 | 1.80431 | 40.9 |
|  | L4 | 7 | −5.46 | 0.500 | 1.71736 | 29.5 |
|  | L5 | 8 | 4.002 | 0.900 | 1.66547 | 55.2 |
|  |  | 9 | 5.329* | Variable |  |  |
| G3 | L6 | 10 | 16.627* | 1.350 | 1.66547 | 55.2 |
|  |  | 11 | −41.093* | Variable |  |  |
| P |  | 12 | ∞ | 2.040 | 1.51680 | 64.2 |
|  |  | 13 | ∞ |  |  |  |

TABLE 2

| Surface | κ | D | E | F |
|---|---|---|---|---|
| 2 | −9.77657E−01 | 2.28982E−04 | 5.23582E−06 | −1.40910E−07 |
| 6 | −8.00021E−01 | 6.95507E−04 | 5.28765E−05 | −8.58817E−06 |
| 9 | 0.00000E+00 | 3.02252E−03 | 4.48490E−04 | −6.95340E−05 |
| 10 | 0.00000E+00 | −2.64986E−04 | 3.68409E−05 | −6.13395E−06 |
| 11 | 0.00000E+00 | −3.99524E−05 | −1.19838E−05 | 0.00000E+00 |

| Surface | G | H | I |
|---|---|---|---|
| 2 | 1.75832E−09 | 0.00000E+00 | 0.00000E+00 |
| 6 | 5.02626E−07 | 0.00000E+00 | 0.00000E+00 |
| 9 | 9.47521E−06 | 0.00000E+00 | 0.00000E+00 |
| 10 | 4.94345E−07 | −2.20630E−08 | 4.04724E−10 |
| 11 | 0.00000E+00 | 0.00000E+00 | 0.00000E+00 |

TABLE 3

| Axial distance | Wide-angle limit | Middle position | Telephoto limit |
|---|---|---|---|
| d4 | 16.617 | 6.290 | 1.446 |
| d9 | 3.623 | 7.346 | 15.861 |
| d11 | 3.693 | 3.809 | 2.014 |
| f | 5.96 | 10.05 | 17.33 |
| F | 2.88 | 3.58 | 5.14 |
| 2ω | 63.07 | 39.57 | 23.21 |
| L | 37.362 | 30.874 | 32.751 |

Example 2

A zoom lens system of Example 2 corresponds to Embodiment 2 shown FIGS. 3A to 3C. The lens data of the zoom lens system of Example 2 is shown in Table 4, the aspherical data is shown in Table 5, and the focal length, the F-number, the viewing angle, the total optical length and the variable axial distance data when the shooting distance is ∞ are shown in Table 6.

TABLE 4

| Lens unit | Lens | Surface | r | d | nd | νd |
|---|---|---|---|---|---|---|
| G1 | L1 | 1 | 120.896 | 1.500 | 1.80431 | 40.9 |
|  |  | 2 | 6.000* | 1.433 |  |  |
|  | L2 | 3 | 9.566 | 2.000 | 1.80518 | 25.5 |
|  |  | 4 | 39.207 | Variable |  |  |
| Diaphragm |  | 5 | ∞ | 0.900 |  |  |
| G2 | L3 | 6 | 4.953* | 2.350 | 1.80431 | 40.9 |
|  | L4 | 7 | −4.806 | 0.500 | 1.71736 | 29.5 |
|  | L5 | 8 | 4.633 | 1.000 | 1.66547 | 55.2 |
|  |  | 9 | 5.037* | Variable |  |  |
| G3 | L6 | 10 | 21.222* | 1.300 | 1.60602 | 57.4 |
|  |  | 11 | −22.956* | Variable |  |  |
| P |  | 12 | ∞ | 2.040 | 1.51680 | 64.2 |
|  |  | 13 | ∞ |  |  |  |

TABLE 5

| Surface | κ | D | E | F |
|---|---|---|---|---|
| 2 | −1.02419E−01 | −3.66050E−04 | 5.76483E−07 | −2.78154E−07 |
| 6 | −9.23698E−01 | 7.55352E−04 | 2.63999E−05 | −3.27990E−06 |
| 9 | 0.00000E+00 | 3.34594E−03 | 2.52795E−04 | 0.00000E+00 |
| 10 | 0.00000E+00 | −2.05546E−04 | 2.02553E−04 | −4.01632E−05 |
| 11 | 0.00000E+00 | 2.51552E−04 | 8.76993E−05 | −1.98769E−05 |

TABLE 5-continued

| Surface | G | H | I | J |
|---|---|---|---|---|
| 2 | −8.64232E−09 | 5.03171E−10 | −9.58343E−12 | −3.38616E−14 |
| 6 | 0.00000E+00 | 0.00000E+00 | 0.00000E+00 | 0.00000E+00 |
| 9 | 0.00000E+00 | 0.00000E+00 | 0.00000E+00 | 0.00000E+00 |
| 10 | 2.85595E−06 | −7.82626E−08 | 0.00000E+00 | 0.00000E+00 |
| 11 | 1.12546E−06 | −4.69895E−08 | 3.35774E−09 | −1.29542E−10 |

TABLE 6

| Axial distance | Wide-angle limit | Middle position | Telephoto limit |
|---|---|---|---|
| d4 | 16.901 | 7.331 | 1.619 |
| d9 | 3.859 | 7.678 | 15.865 |
| d11 | 3.559 | 3.358 | 1.502 |
| f | 5.98 | 9.74 | 17.30 |
| F | 2.87 | 3.56 | 5.14 |
| 2ω | 63.09 | 40.54 | 23.21 |
| L | 37.932 | 31.980 | 32.599 |

Example 3

A zoom lens system of Example 3 corresponds to Embodiment 3 shown FIGS. 5A to 5C. The lens data of the zoom lens system of Example 3 is shown in Table 7, the aspherical data is shown in Table 8, and the focal length, the F-number, the viewing angle, the total optical length and the variable axial distance data when the shooting distance is ∞ are shown in Table 9.

TABLE 7

| Lens unit | Lens | Surface | r | d | nd | νd |
|---|---|---|---|---|---|---|
| G1 | L1 | 1 | 53.500 | 1.500 | 1.80431 | 40.9 |
|  |  | 2 | 5.807* | 1.500 |  |  |
|  | L2 | 3 | 9.487 | 1.800 | 1.84666 | 23.8 |
|  |  | 4 | 27.52 | Variable |  |  |
| Diaphragm |  | 5 | ∞ | 0.900 |  |  |
| G2 | L3 | 6 | 5.031* | 2.350 | 1.80431 | 40.9 |
|  | L4 | 7 | −5.088 | 0.500 | 1.69895 | 30.0 |
|  | L5 | 8 | 3.876 | 0.900 | 1.60602 | 57.4 |
|  |  | 9 | 5.41* | Variable |  |  |
| G3 | L6 | 10 | 24.154* | 1.600 | 1.66547 | 55.2 |
|  |  | 11 | −29.807* | Variable |  |  |
| P |  | 12 | ∞ | 2.040 | 1.51680 | 64.2 |
|  |  | 13 | ∞ |  |  |  |

TABLE 8

| Surface | κ | D | E | F |
|---|---|---|---|---|
| 2 | −1.00818E+00 | 2.47026E−04 | 4.70180E−06 | −1.25469E−07 |
| 6 | −8.98118E−01 | 6.71516E−04 | 4.52410E−05 | −9.63004E−06 |
| 9 | 0.00000E+00 | 3.06701E−03 | 3.60221E−04 | −2.91776E−05 |
| 10 | 0.00000E+00 | −3.51348E−04 | 2.95595E−05 | −6.84761E−06 |
| 11 | 0.00000E+00 | −1.06774E−04 | −1.66481E−05 | 0.00000E+00 |

| Surface | G | H | I |
|---|---|---|---|
| 2 | 1.58935E−09 | 0.00000E+00 | 0.00000E+00 |
| 6 | 5.83782E−07 | 0.00000E+00 | 0.00000E+00 |
| 9 | 2.00545E−06 | 0.00000E+00 | 0.00000E+00 |
| 10 | 6.66102E−07 | −3.56669E−08 | 7.75914E−10 |
| 11 | 0.00000E+00 | 0.00000E+00 | 0.00000E+00 |

TABLE 9

| Axial distance | Wide-angle limit | Middle position | Telephoto limit |
|---|---|---|---|
| d4 | 16.562 | 6.242 | 1.422 |
| d9 | 3.230 | 6.729 | 15.400 |
| d11 | 3.921 | 4.102 | 2.011 |
| f | 5.96 | 10.05 | 17.34 |
| F | 2.89 | 3.57 | 5.11 |
| 2ω | 63.17 | 38.15 | 23.10 |
| L | 37.893 | 31.252 | 33.013 |

Example 4

A zoom lens system of Example 4 corresponds to Embodiment 4 shown in FIGS. 7A to 7C. The lens data of the zoom lens system of Example 4 is shown in Table 10, the aspherical data is shown in Table 11, and the focal length, the F-number, the viewing angle, the total optical length and the variable axial distance data when the shooting distance is ∞ are shown in Table 12.

TABLE 10

| Lens unit | Lens | Surface | r | d | nd | νd |
|---|---|---|---|---|---|---|
| G1 | L1 | 1 | 53.511 | 1.500 | 1.80431 | 40.9 |
|  |  | 2 | 5.806* | 1.500 |  |  |
|  | L2 | 3 | 9.507 | 1.800 | 1.84666 | 23.8 |
|  |  | 4 | 27.675 | Variable |  |  |
| Diaphragm |  | 5 | ∞ | 0.900 |  |  |
| G2 | L3 | 6 | 5.03* | 2.350 | 1.80431 | 40.9 |
|  | L4 | 7 | −5.078 | 0.500 | 1.69895 | 30.0 |
|  | L5 | 8 | 3.875 | 0.900 | 1.60602 | 57.4 |
|  |  | 9 | 5.413* | Variable |  |  |
| G3 | L6 | 10 | 23.79* | 1.500 | 1.66547 | 55.2 |
|  |  | 11 | −30.771* | Variable |  |  |
| P |  | 12 | ∞ | 2.040 | 1.51680 | 64.2 |
|  |  | 13 | ∞ |  |  |  |

TABLE 11

| Surface | κ | D | E | F |
|---|---|---|---|---|
| 2 | −1.00722E+00 | 2.47566E−04 | 4.57964E−06 | −1.24877E−07 |
| 6 | −8.98696E−01 | 6.70963E−04 | 4.50742E−05 | −9.61013E−06 |
| 9 | 0.00000E+00 | 3.07029E−03 | 3.63863E−04 | −2.99534E−05 |
| 10 | 0.00000E+00 | −3.51882E−04 | 2.95360E−05 | −6.84730E−06 |
| 11 | 0.00000E+00 | −1.06993E−04 | −1.66862E−05 | 0.00000E+00 |

| Surface | G | H | I |
|---|---|---|---|
| 2 | 1.63209E−09 | 8.59814E−15 | −1.06852E−14 |
| 6 | 5.80743E−07 | 0.00000E+00 | 0.00000E+00 |
| 9 | 1.92812E−06 | 0.00000E+00 | 0.00000E+00 |
| 10 | 6.65408E−07 | −3.57054E−08 | 7.79628E−10 |
| 11 | 0.00000E+00 | 0.00000E+00 | 0.00000E+00 |

TABLE 12

| Axial distance | Wide-angle limit | Middle position | Telephoto limit |
|---|---|---|---|
| d4 | 16.744 | 6.256 | 1.418 |
| d9 | 3.189 | 6.728 | 15.409 |
| d11 | 3.962 | 4.135 | 2.036 |
| f | 5.90 | 10.03 | 17.33 |
| F | 2.89 | 3.58 | 5.13 |
| 2ω | 63.60 | 39.46 | 23.00 |
| L | 37.475 | 30.698 | 32.442 |

The corresponding values of the Conditions in Examples 1 to 4 are shown in the following Table 13.

TABLE 13

| Condition | Example | | | |
|---|---|---|---|---|
| | 1 | 2 | 3 | 4 |
| nd4 | 1.71736 | 1.71736 | 1.69895 | 1.69895 |
| vd4 | 29.5 | 29.5 | 30.0 | 30.0 |
| \|fL4\|/fG2 | 0.264 | 0.271 | 0.263 | 0.264 |
| $d_{G1}$ | 4.800 | 4.933 | 4.800 | 4.800 |
| $d_{G2}$ | 3.750 | 3.850 | 4.650 | 4.650 |
| $d_{G3}$ | 1.350 | 1.300 | 1.600 | 1.500 |
| $d_{Gsi}$ | 9.900 | 10.083 | 11.050 | 10.950 |
| $d_{Gsi}/Z$ | 3.406 | 3.484 | 3.795 | 3.731 |
| \|r4F/fw\| | 0.916 | 0.804 | 0.854 | 0.860 |
| \|r4R/fw\| | 0.671 | 0.775 | 0.651 | 0.656 |

FIGS. 2A to 2I are aberration graphics of the zoom lens system according to Example 1. FIGS. 4A to 4I are aberration graphics of the zoom lens system according to Example 2. FIGS. 6A to 6I are aberration graphics of the zoom lens system according to Example 3. FIGS. 8A to 8I are aberration graphics of the zoom lens system according to Example 4.

FIGS. 2A to 2C, 4A to 4C, 6A to 6C and 8A to 8C show aberrations at the wide-angle limit. FIGS. 2D to 2F, 4D to 4F, 6D to 6F and 8D to 8F show aberrations at the middle position. FIGS. 2G to 2I, 4G to 4I, 6G to 6I and 8G to 8I show aberrations at the telephoto limit. FIGS. 2A, 2D, 2G, 4A, 4D, 4G, 6A, 6D, 6G, 8A, 8D and 8G show spherical aberration. FIGS. 2B, 2E, 2H, 4B, 4E, 4H, 6B, 6E, 6H, 8B, 8E and 8H show astigmatism. FIGS. 2C, 2F, 2I, 4C, 4F, 4I, 6C, 6F, 6I, 8C, 8F and 8I show distortion. In the graphic representations of spherical aberration, the vertical axis represents the F-number, the solid line represents the characteristic to d-line, the short dash line represents the characteristic to F-line, and the long dash line represents the characteristic to C-line. In the graphic representations of astigmatism, the vertical axis represents the half view angle, the solid line represents the characteristic on the sagittal plane, and the dash line represents the characteristic on the meridional plane. In the graphic representations of distortion, the vertical axis represents the half view angle.

Although the present invention has been described in detail, the foregoing description is in all aspects illustrative and not restrictive. It is understood that various modifications and changes can be devised without departing from the scope of the present invention.

What is claimed is:

1. A zoom lens system for forming an optical image of an object with variable magnification, in order from an object side, comprising:
   a first lens unit having negative power,
   a second lens unit having positive power and
   a third lens unit having positive power, wherein
      magnification is varied with change in intervals between each lens unit by independently moving each lens unit along an optical axis, and characterized in that
      the first lens unit comprises one negative lens element and one positive lens element;
      the second lens unit comprises only a cemented lens element having set of three lens elements which are cemented with each other; and
      the third lens unit comprises one positive lens element.

2. The zoom lens system according to claim 1, which comprises a diaphragm on the object side of the second lens unit.

3. The zoom lens system according to claim 1, wherein the first lens unit, in order from the object side, comprises one negative lens element and one positive lens element.

4. The zoom lens system according to claim 1, wherein the second lens unit comprises a cemented lens element, in order from the object side, having a positive lens element, a negative lens element and a positive lens element, which are cemented with each other.

5. The zoom lens system according to claim 1, wherein the conditions are satisfied:

$$nd4 < 1.75 \quad (1)$$

$$vd4 < 35 \quad (2)$$

where nd4 is a refractive index to a d-line of a negative lens element of the second lens unit, and vd4 is Abbe number thereof.

6. The zoom lens system according to claim 1, wherein the condition is satisfied:

$$0.2 < |fL4|/fG2 < 0.4 \quad (3)$$

where fG2 is a focal length of the second lens unit, and fL4 is a focal length of the negative lens element.

7. The zoom lens system according to claim 1, wherein the condition is satisfied:

$$3 < dGsi/Z < 5 \quad (4)$$

(here, Z > 2.5)

where Z is a zoom ratio at wide-angle and telephoto limits when a shooting distance is ∞, dGi is a thickness of an i-th lens unit (i is an integer), and dGsi [unit: mm] is a sum of thickness of each lens unit.

8. The zoom lens system according to claim 1, wherein focusing from an infinity object point to a close object point is performed by moving the third lens unit in the direction of an optical axis.

9. The zoom lens system according to claim 1, wherein one positive lens element of the third lens unit is a biconvex lens.

10. An imaging device capable of converting an optical image of a subject to an electric image signal and outputting the electric image signal, comprising:
    a zoom lens system for forming the optical image of the subject with variable magnification, and
    an image sensor for converting the optical image of the subject formed by the zoom lens system to the electric signal, wherein
    the zoom lens system, in order from an object side, comprises a first lens unit having negative power, a second lens unit having positive power and a third lens unit having positive power, in which magnification is varied with change in intervals between each lens unit by independently moving each lens unit along an optical axis, and characterized in that
    the first lens unit comprises one negative lens element and one positive lens element;
    the second lens unit comprises only a cemented lens element having set of three lens elements which are cemented with each other; and
    the third lens unit comprises one positive lens element.

11. The imaging device according to claim 10, which comprises a diaphragm on the object side of the second lens unit.

12. The imaging device according to claim 10, wherein the first lens unit, in order from the object side, comprises one negative lens element and one positive lens element.

13. The imaging device according to claim 10, wherein the second lens unit comprises a cemented lens element, in order from the object side, having a positive lens element, a negative lens element and a positive lens element, which are cemented with each other.

14. The imaging device according to claim 10, wherein the conditions are satisfied:

$$nd4<1.75 \quad (1)$$

$$vd4<35 \quad (2)$$

where nd4 is a refractive index to a d-line of a negative lens element of the second lens unit, and vd4 is Abbe number thereof.

15. The imaging device according to claim 10, wherein the condition is satisfied:

$$0.2<|fL4|/fG2<0.4 \quad (3)$$

where fG2 is a focal length of the second lens unit, and fL4 is a focal length of the negative lens element.

16. The imaging device according to claim 10, wherein the condition is satisfied:

$$3<dGsi/Z<5 \quad (4)$$

(here, Z>2.5)
where Z is a zoom ratio at wide-angle and telephoto limits when a shooting distance is ∞, dGi is a thickness of an i-th lens unit (i is an integer), and dGsi [unit: mm] is a sum of thickness of each lens unit.

17. The imaging device according to claim 10, wherein focusing from an infinity object point to a close object point is performed by moving the third lens unit in the direction of an optical axis.

18. The imaging device according to claim 10, wherein one positive lens element of the third lens unit is a biconvex lens.

19. A camera capable of image-taking a subject and outputting an image as an electric image signal, comprising:
   an imaging device comprising a zoom lens system for forming an optical image of the subject with variable magnification and an image sensor for converting the optical image of the subject formed by the zoom lens system to the electric signal, wherein
   the zoom lens system, in order from an object side, comprises a first lens unit having negative power, a second lens unit having positive power and a third lens unit having positive power, in which magnification is varied with change in intervals between each lens unit by independently moving each lens unit along an optical axis, and characterized in that
   the first lens unit comprises one negative lens element and one positive lens element;
   the second lens unit comprises only a cemented lens element having set of three lens elements which are cemented with each other; and
   the third lens unit comprises one positive lens element.

20. The camera according to claim 19, which is a digital still camera capable of obtaining a still image of the subject.

21. The camera according to claim 19, which is a digital video camera capable of obtaining a moving image of the subject.

* * * * *